US005870876A

United States Patent [19]

Deiter

[11] Patent Number: 5,870,876

[45] Date of Patent: Feb. 16, 1999

[54] CONVERTED WOOD ARTICLES, COMPOSITE WOOD PRODUCTS MADE THEREFROM AND METHOD OF MAKING SAME

[75] Inventor: Frank Deiter, Princeton, Canada

[73] Assignee: Synergy Wood Processing Inc., Vancouver, Canada

[21] Appl. No.: 805,141

[22] Filed: Feb. 24, 1997

[51] Int. Cl.[6] .............................. E04C 3/30; B32B 31/00

[52] U.S. Cl. ........................ 52/731.1; 52/730.1; 52/730.7; 52/DIG. 8; 144/345; 144/355; 144/360; 144/363

[58] Field of Search .................................... 52/233, 731.7, 52/731.1, 730.7, DIG. 8; 446/106, 108, 115, 117, 124, 125; 144/345, 355, 360, 363

[56] References Cited

U.S. PATENT DOCUMENTS

| | | |
|---|---|---|
| Re. 35,327 | 9/1996 | Sing . |
| 3,961,654 | 6/1976 | Hasenwinkle . |
| 4,394,409 | 7/1983 | Hertel . |
| 5,299,400 | 4/1994 | Sing . |

FOREIGN PATENT DOCUMENTS

| | | |
|---|---|---|
| 0 029 256 | 5/1981 | European Pat. Off. . |
| 962 589 | 12/1949 | France . |
| 81 17400 | 9/1981 | France . |
| 2 649 637 | 1/1991 | France . |
| 964 637 | 5/1957 | Germany . |
| 21 59 337 | 6/1973 | Germany . |
| 118 229 | 2/1947 | Sweden . |
| 2 122 706 | 7/1983 | United Kingdom . |
| 90/01092 | 2/1990 | WIPO . |
| 97/10934 | 3/1997 | WIPO . |

*Primary Examiner*—Christopher Kent
*Assistant Examiner*—Yvonne Horton-Richardson
*Attorney, Agent, or Firm*—Hall, Priddy & Myers

[57] ABSTRACT

A converted wood article for use in combination with other converted wood articles to form composite wood products for use in general construction such as in the construction of posts, flooring, walls and support beams.

22 Claims, 6 Drawing Sheets

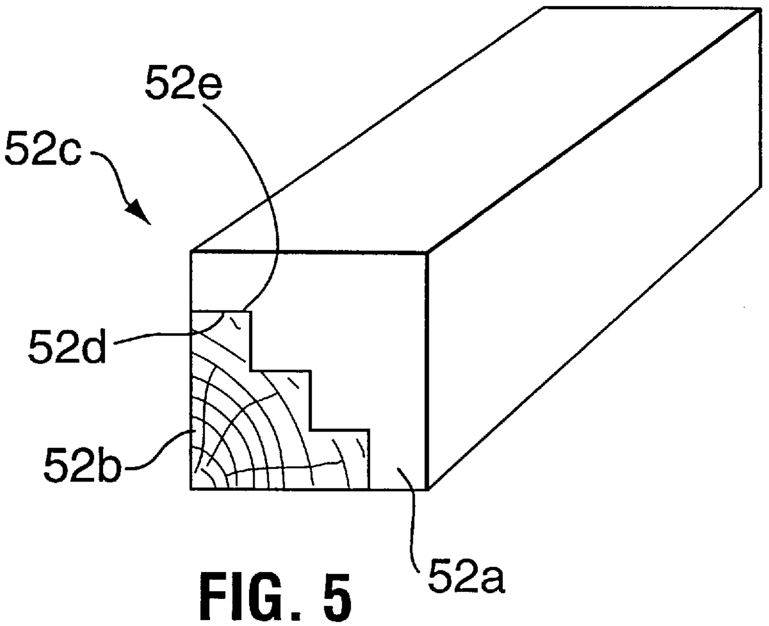
FIG. 5
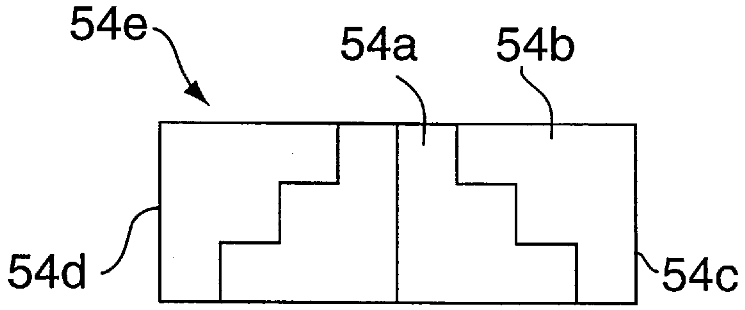
FIG. 6
FIG. 4B
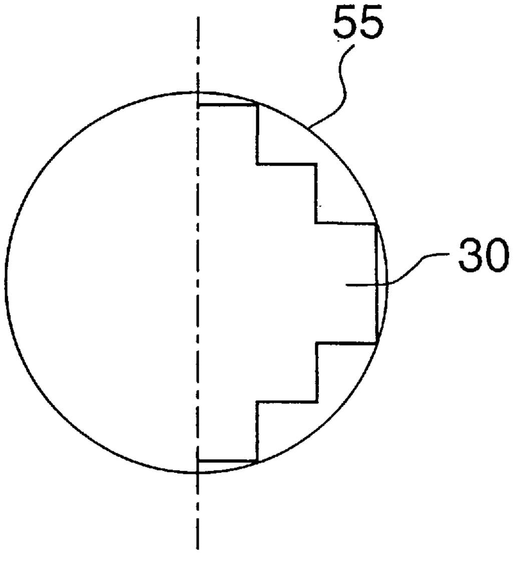

CONVERTED WOOD ARTICLES, COMPOSITE WOOD PRODUCTS MADE THEREFROM AND METHOD OF MAKING SAME

FIELD

The present invention relates to converted wood articles and composite wood products made therefrom for use in general construction primarily but not limited to posts, flooring, walls and support beams.

BACKGROUND

The depletion of old growth forest has placed increasing demand within the forest industry for alternative wood products which make better use of old growth and stagnant growth timber and which also provide for greater use of second, third and later generation trees.

Several alternative wood products have emerged in an effort to address some of the needs in the industry. In this respect U.S. Pat. No. 4,394,409 discloses a composite wood product formed from four elongated triangular-shaped wood pieces. The four pieces are joined to form a composite wood product having a cross-sectional outline of a parallelogram and a hollow interior. An alternative embodiment is disclosed where each wood piece has a pair of machined keys to improve yield.

In U.S. Pat. No. 5,299,400 there is disclosed a composite wood product formed from four log parts, each log part having a three sided cross-section forming either right angled sectors and a third curved side or a right triangle. The log parts are assembled into a composite wood product so that their right angles form the corners of a rectangle with a hollow interior which is filled with concrete or other structural enhancing material. Similar examples of this alternative wood structure appear in U.S. Pat. No. Reissue 35,327 and French Patent No. 962589. Other attempts to offer improved composite wood products can be found in French Patent No. 2512729 and German Patent No. 964637.

While the composite wood products disclosed in the above mentioned references provide some improvements to the known art, there remains a continuing need for composite wood products providing additional resistance to shearing forces and impact forces, assembled from converted wood parts having a larger bonding surface and having a higher load bearing capacity without the preemptive need for the structural reinforcing material indicated in the prior art. Accordingly, it is an object of the invention to provide alternative converted wood articles for use in making composite wood products to fulfill the above needs in the art.

SUMMARY OF THE INVENTION

According to the invention there is provided a converted wood article comprising four wood pieces. Each wood piece comprises at least four lateral surfaces including an inner surface, an outer surface opposing and substantially parallel to the inner surface, and two stair-like surfaces. The stair-like surfaces are shaped in an opposing arrangement so as to meet each other to form the inner surface and are sized to mate with one of the stair-like surfaces of another of the wood pieces. Each stair-like surface has a plurality of right-angled steps arranged in an offset sequence so that each of the two stair-like surfaces converge toward each other from the outer surface to the inner surface. Each wood piece is substantially symmetrical around a notional plane bisecting both the inner surface and the outer surface, the notional plane being located substantially between the two stair-like surfaces. Moreover, the wood pieces are joined along the stair-like surfaces with each inner surface arranged inwardly such that the composite wood article has a substantially outer cross-section.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 4B is a cross-sectional view of a log and a converted wood article cut therefrom;

FIG. 5 is a perspective view of a composite wood product comprising converted wood articles;

FIG. 6 is a cross-sectional view of another composite wood product comprising converted wood articles;

DETAIL DESCRIPTION WITH REFERENCE TO THE DRAWINGS

Figure 1:
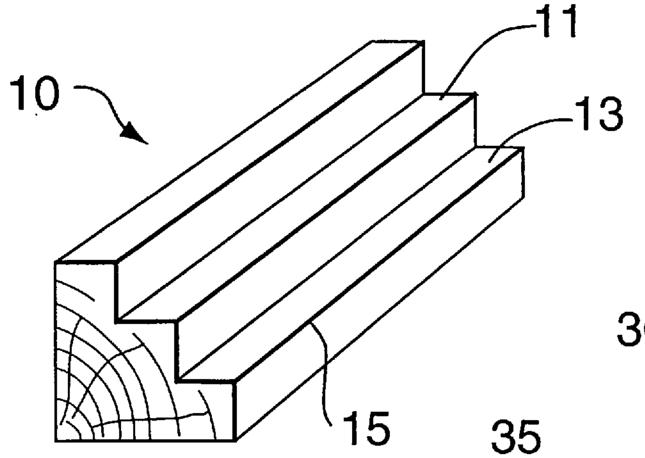
FIG. 1 is a perspective view of one converted wood article having two flat sides and one stepped side.

Referring to FIG. 1, a converted wood article 10 is formed according to the method set out below from a wood piece 11 and having steps 13 extending longitudinally along stepped side 15.

Figure 2:
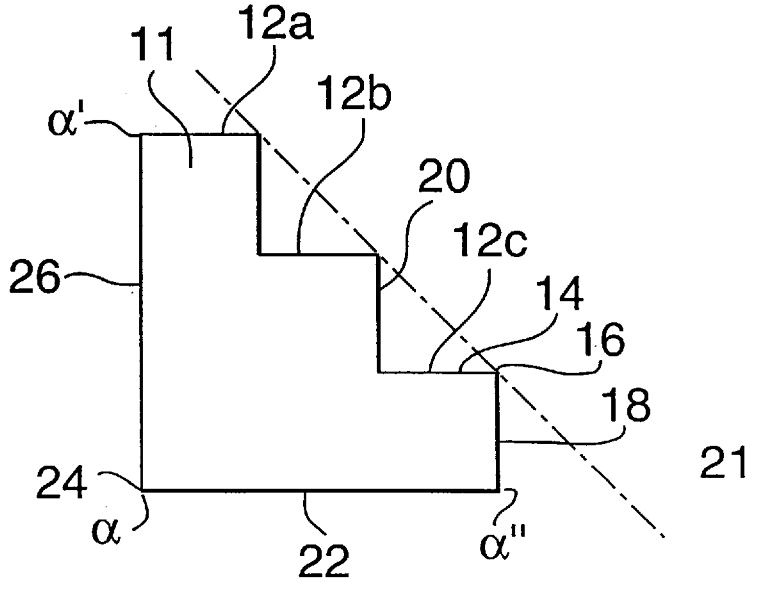
FIG. 2 is a cross-sectional view of a portion of the converted wood article in FIG. 1.

Referring to FIG. 2 converted wood article 10 includes flat sides 22 and 26 and stepped side 20. First flat side 22 and second flat side 26 intersect at region 24 forming substantially right angle α. Stepped side 20 intersects with flat side 22 and flat side 26 forming substantially right angles α' and α" respectively. Steps 12*a*, 12*b*, and 12*c* form the outline of stepped side 20. Each of steps 12*a*, 12*b*, and 12*c* has a first edge 14 and a second edge 18 intersecting at substantially right angle corner 16. In the embodiment illustrated steps 12*a*, 12*b*, and 12*c* are dimensioned and oriented such that each corner 16 substantially lies along a notional straight line 21.

Figure 3:
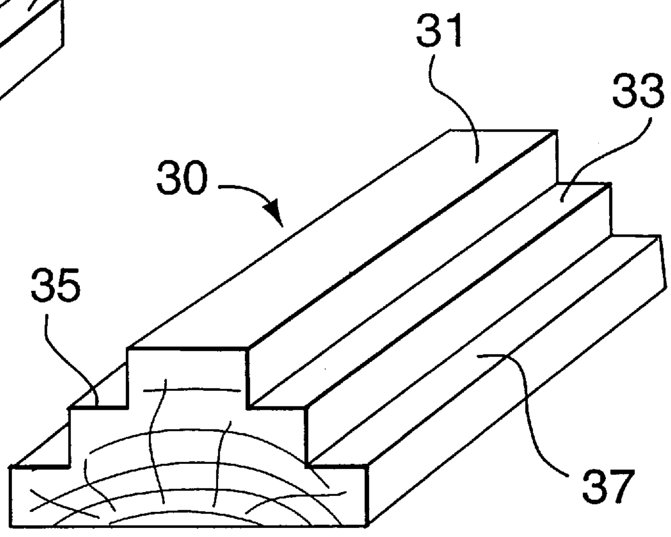
FIG. 3 is a perspective view of another converted wood article having one flat side and two stepped sides.

Referring to FIG. 3, a converted wood article 30 is formed from elongated wood piece 31 having steps 37 on stepped side 33 and stepped side 35.

Figure 4A:
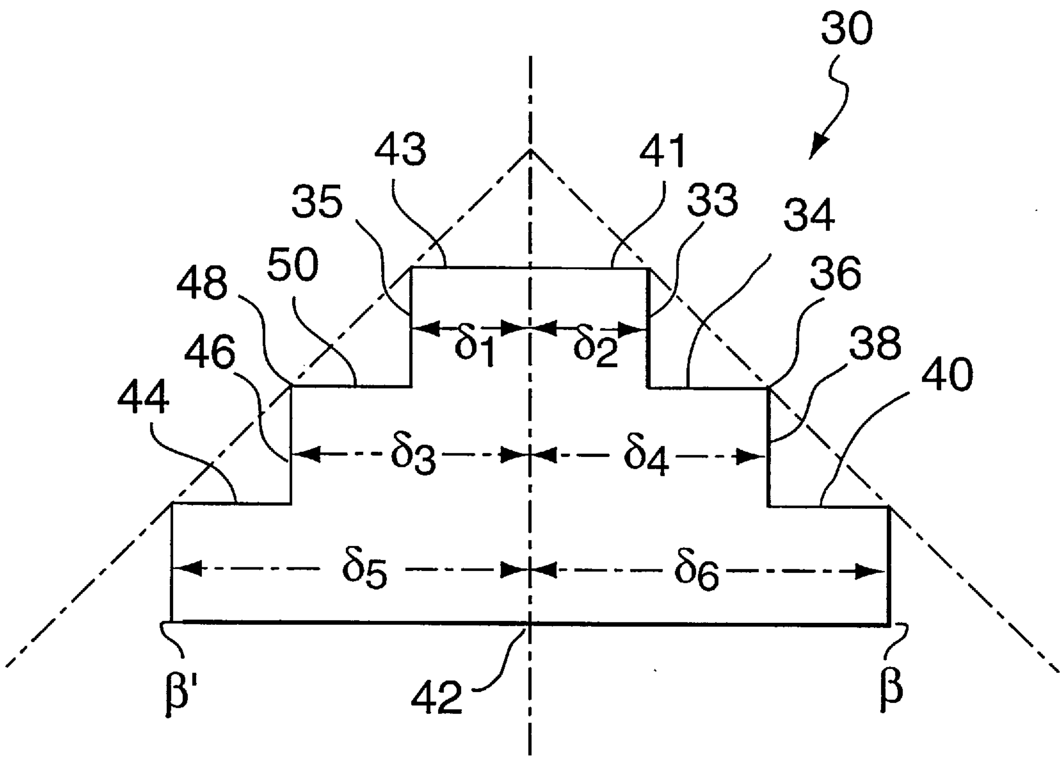
FIG. 4A is a cross-sectional view of a portion of the covered wood article in FIG. 3.

Referring to FIG. 4A, another converted wood article 30 is shown having stepped sides 33 and 35, and flat side 42. Stepped side 33 is formed from steps 40 with each of steps 40 having edge 34 and edge 38 which intersect at substantially right angle corner 36. Stepped side 35 is similarly formed from steps 44 each having edges 46 and 50 intersecting at substantially right angle corner 48. Each of steps 40 and each of steps 44 after first steps 41 and 43 are successively offset from bisecting line 42. Accordingly, stepped sides 33 and 35 are arranged so that distances $\delta_1$, $\delta_3$, and $\delta_5$ from bisecting line 42 and distances $\delta_2$, $\delta_4$, and $\delta_6$ from bisecting line 42 are successively larger.

Referring to FIGS. 1 to 4B, typically, wood pieces 11 and 31 will be cut from log 55 having a diameter of approximately 100 mm which has been sectioned into 1 meter lengths, although the diameter and length of the log could be larger or smaller depending on the selected application. In the illustrative embodiment in FIGS. 1 and 2, converted wood article 10 is formed from a log with a 100 mm diameter which has been sectioned into 1 meter long segments. Converted wood article 10 has three steps on stepped side 20, each step having a height and width of approximately 15 mm. The cross-sectional length of that sides 22 and 26 are 45 mm each. Converted wood in FIGS. 3 and 4A is cut from a log having a diameter of approximately 100 mm which has been sectioned into 1 meter lengths. Each step of stepped sides 33 and 35 has a height and width of 15 mm, so that flat side 42 has a length of approximately 90 mm. The above dimensions are illustrative of some of the typical converted wood articles contemplated in the present invention. It will be understood, however, that the length, height and width of converted wood articles and the dimensions and number of steps will vary for selected applications as seen from the different embodiments illustrated in FIG. 7A to 9.

The converted wood articles in FIGS. 1 to 4B may be used to form a large variety of composite wood products, as indicated by way of example in FIGS. 5 to 11.

Referring to FIG. 5, converted wood articles **52*a* and 52*b* are arranged to form composite wood product 52*c*. Stepped side 52*d* and 52*e* of wood articles 52*a* and 52*b* respectively are oriented inwardly and mate with each other so that composite wood product 52*c*** has a rectangular cross-sectional outline.

Referring to FIG. 6, converted wood articles **54*a* and 54*b* are arranged to form composite wood pair 54*c* which in turn is attached to second composite wood pair 54*d* to form composite wood product 54*e***. Additional composite wood pairs (not shown) may be attached to form larger composite wood products.

Figure 7B:
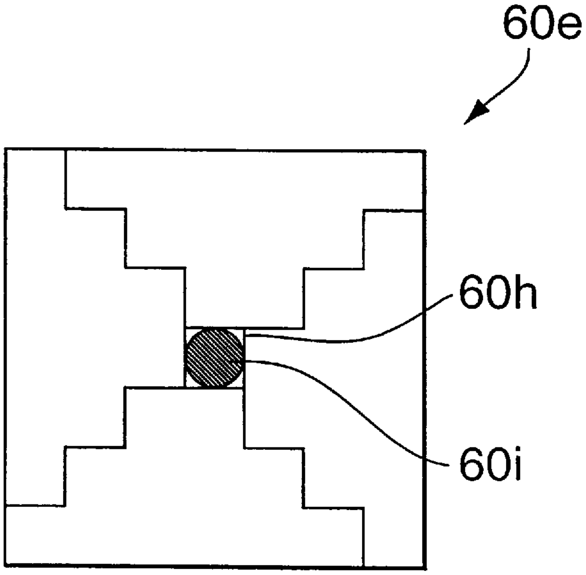
FIG. 7B is a cross-sectional view of another composite wood product.

Referring to, the cross-section of another composite wood product **60*e* is shown comprising converted wood articles 60*a*, 60*b*, 60*c*, and 60*d* which are of substantially similar dimension. Stepped sides 60*f* on each of converted wood articles 60*a* to 60*d* are oriented to face inwardly within composite wood product 60*e* so as to abut corresponding stepped sides of neighboring wood articles forming hollow rectangular interior 60*h* and substantially rectangular cross-sectional outline 60*g*. Referring to FIG. 7B, composite wood product 60*e* is shown having reinforcing rod 60*i* fixed within hollow rectangular interior 60*h*** to provide enhanced load bearing capacity.

Figure 8:
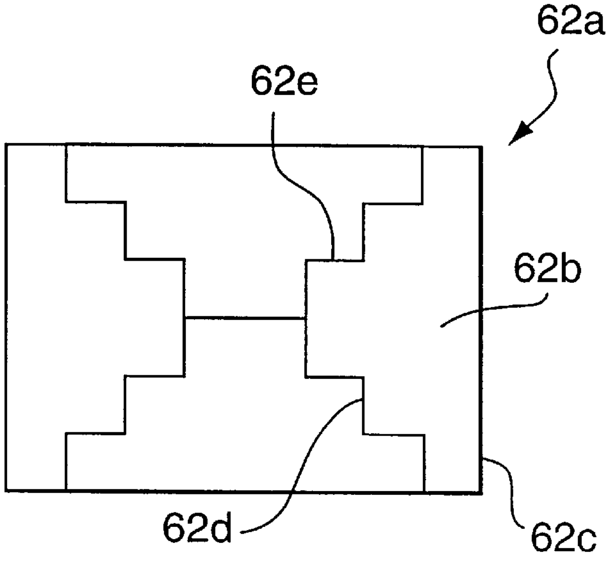
FIG. 8 is a cross-sectional view of yet another composite wood product comprising an arrangement of converted wood articles.

Referring to FIG. 8, another composite wood product **62*a* is shown having rectangular cross section 62*c* and comprising converted wood articles 62*b* each having stepped sides 62*d* and 62*e***.

Figure 9:
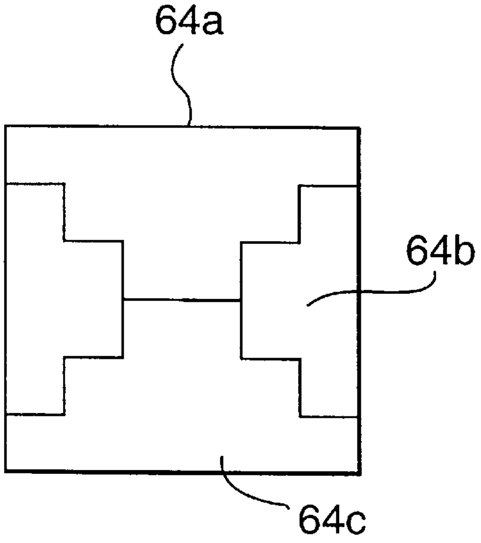
FIG. 9 is a cross-sectional view of yet another composite wood product.

Referring to FIG. 9, yet another composite wood product **64*a* is shown comprising two different sets of converted wood articles, contemplated herein namely converted wood articles 64*b* and converted wood articles 64*c***.

Figure 10:
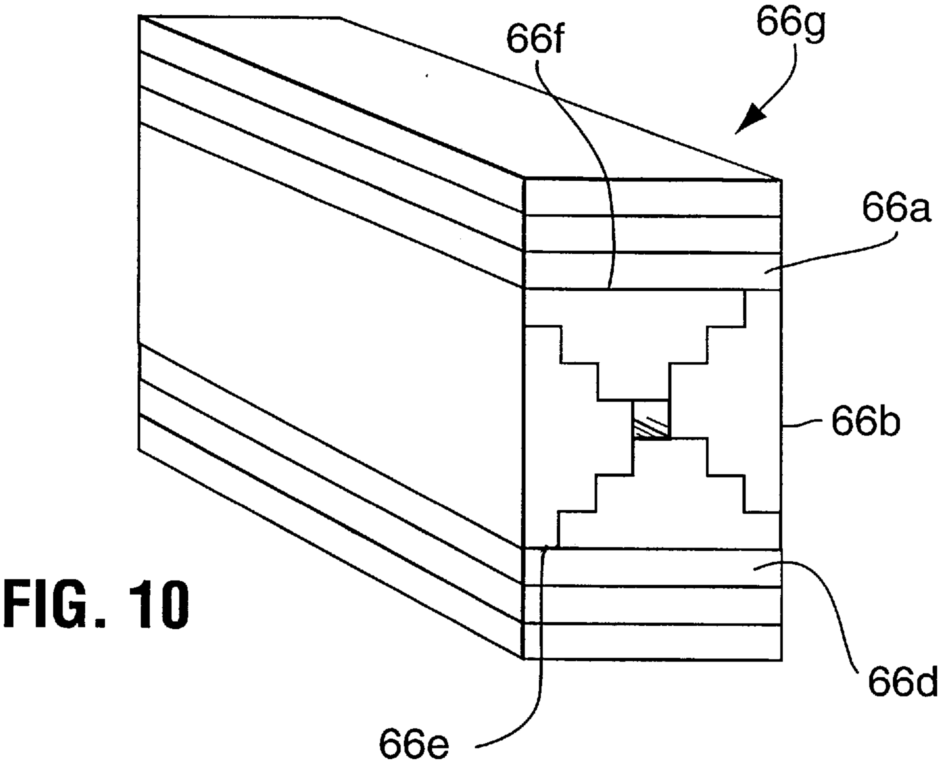
FIG. 10 is a perspective view of a composite wood product used in conjunction with other wood boards.

Referring to FIG. 10, composite wood product **66*b* is shown located between wood boards 66*a* and wood boards 66*d* which in combination form composite wood product 66*g*. Wood boards 66*a* and 66*d* are shown attached to sides 66*e* and 66*f* of composite wood product 66*b***.

Figure 11:
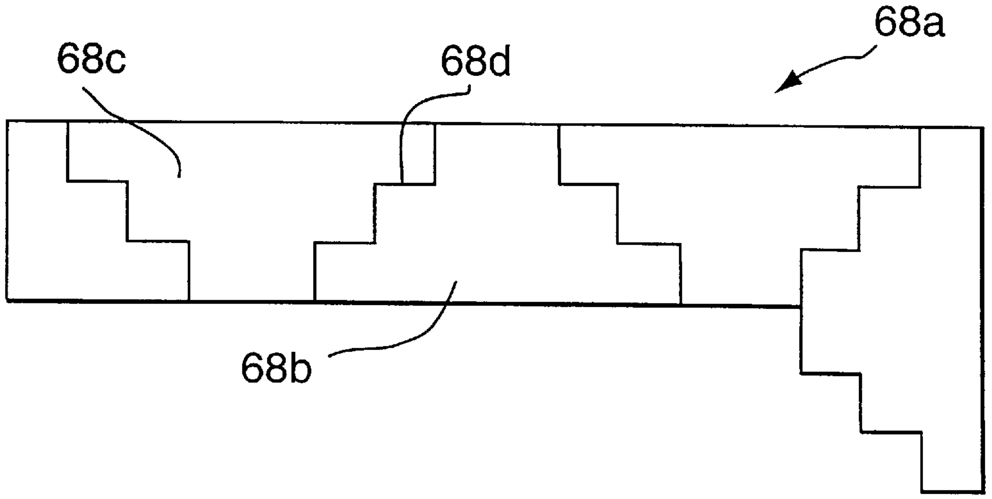
FIG. 11 is a cross-sectional view of another composite wood product under this invention.

Referring to FIG. 11, composite wood product **68*a* has converted wood articles 68*b* and converted wood articles 68*c* inversely arranged and joined along stepped sides 68*d*. As with the other composite wood products, the number of steps on any side of converted wood articles 68*b* and 68*c*** will vary with the selected application.

Figure 12:
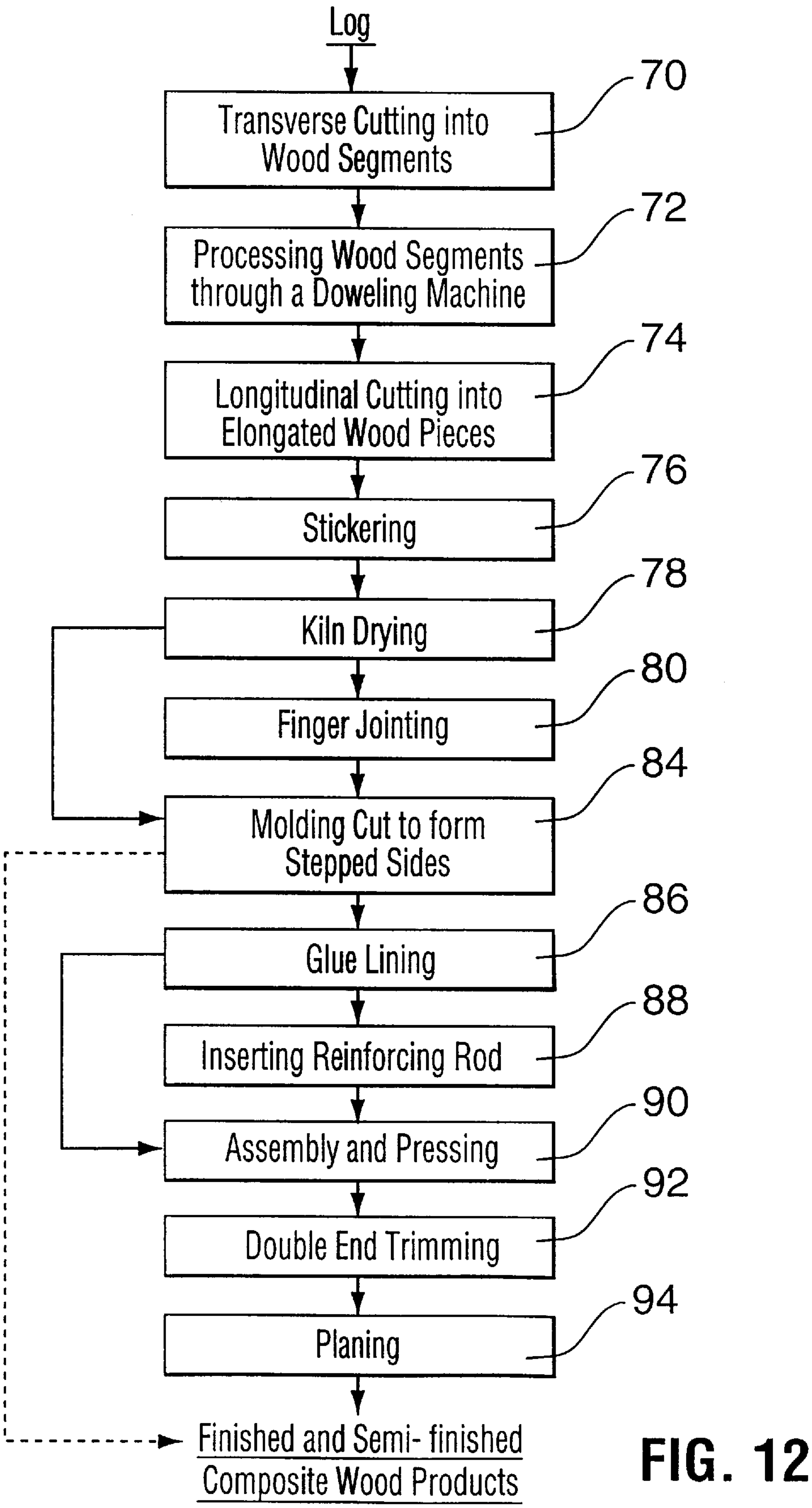
FIG. 12 is a flow diagram for the method of making converted wood articles and composite wood products.

Referring to FIG. 12, one method of manufacturing the composite wood articles and composite wood products made therefrom is shown. Typically elongated wood logs are used as the initial input product to be processed. At step 70 the wood product is cut transversely into wood segments which vary in range with the desired finished or semifinished product. In one preferable embodiment, the wood segments are cut substantially into 1 meter lengths to minimize warping when kiln drying at step 78. Other segment lengths may apply depending on the drying effect of the species and the desired application. The resulting wood segments from step 70 are processed at step 72 through a doweling machine and are then each cut longitudinally into elongated wood pieces at step 74. The wood pieces undergo stickering at step 76 and are then kiln dried at step 78. Alternatively, green lumber pieces may be used, which are cut transversely into wood segments at step 70, undergo stickering at step 76 followed by kiln drying at step 78.

The kiln dried wood pieces from step 78 are given a molding cut at step 84 to form converted wood articles of the type described above having either one or more stepped sides. Alternatively, kiln dried wood pieces from step 78 may be finger jointed at step 80 before undergoing the molding cut at step 84. One may also use precomposed wood products, typically laminated or solid wood boards, or wood pieces cut from solid wood boards having a wane along one or more edges in step 84 as an alternative to kiln dried wood pieces from step 78.

The converted wood articles produced at step 84 may be packaged and shipped for subsequent use in assembling the composite wood products described herein.

Alternatively, the converted wood articles may then undergo glue lining at step 86. Glue lining includes the application of bonding material to the surfaces of the stepped side of each converted wood article. The amount and choice of bonding material applied at step 86 to the converted wood articles may vary with the selected application of the final composite wood product. Preferably, the glue lining at step 86 includes application of bonding material to most or substantially all surfaces of each stepped side of the converted wood article. Converted wood articles are also assembled with corresponding converted wood articles in step 86 to form the composite wood products described above.

Once the converted wood products have undergone glue lining and assembly at step 86 the resulting composite wood products are assembled with other corresponding wood articles and pressed at step 90. Composite wood products from step 90 are double end trimmed at step 92 and planed to final desired dimensions at step 94, resulting in semifinished or finished composite wood products. Before undergoing processing at step 90, composite wood products from step 86 which are arranged having a hollow interior, such as in FIG. 7B, may first have a reinforcing rod inserted into the hollow interior at step 88 to provide additional load bearing capacity and resistance to shearing and impact forces. Wood boards may also be glued and pressed to the sides of the composite wood product at step 90.

The converted wood articles described herein offer substantially improved surface area on stepped sides for the application of bonding material. The stepped side or sides on each converted wood article further allows for easy assembly with corresponding converted wood articles to form a wide range of composite wood products. The composite wood products formed from the converted wood articles provide significant improvements in resistance to shearing and impact forces and improved load bearing capacity. The composite wood products further avoid many of the complex reinforcing requirements of the prior art. In addition, the significant resistance to shearing and impact forces achieved in the composite wood products above permits the use of wood pieces from old growth and stagnant growth timber as well as younger generation timber for a much broader application of use in the lumber industry. The composite wood products are well suited for use in making flooring, paneling, support beams, and posts, and are also well suited as substitutes to the conventional use of solid wood pieces in the construction of homes and other buildings. The scope of application for smaller wood pieces provided by the converted wood articles further results in less wood waste.

Upon reference to this specification and the variety of different embodiments illustrated herein, it will be obvious to one skilled in the art that while the converted wood articles have one or more stepped sides, the number of steps on any stepped side will vary as required by the desired composite wood product. It will be further obvious that it is not necessary for the steps on any stepped side to lie on a notional straight line. For instance, where one does not make the composite wood articles having four identical pieces illustrated in FIG. 7A and 8, it would obviously not be necessary for the steps on a stepped side to lie on a notional line. It will be further obvious that the dimensions of each step on a stepped side need not be the same. It will be further obvious that while a reinforcing rod may be inserted during assembly of composite wood products having a hollow interior, any reinforcing material may be inserted.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A composite wood article comprising:

four wood pieces, each wood piece having at least four lateral surfaces comprising:

an inner surface;

two stair-like surfaces shaped in opposing arrangement so as to meet each other to form said inner surface, each stair-like surface having a plurality of right-angled steps arranged in a progressively offset sequence, each stair-like surface sized to mate with one of the stair-like surfaces of another of said wood pieces;

an outer surface located opposite said inner surface and adjoining said two stair-like surfaces, said outer surface substantially parallel with said inner surface;

wherein each wood piece is substantially symmetrical around a notional plane bisecting both the inner surface and the outer surface, said notional plane being located substantially between said two stair-like surfaces; and wherein said wood pieces are joined alone the stair-like surfaces with each inner surface arranged inwardly such that the composite wood article has a substantially rectangular outer cross-section.

2. A composite wood article according to claim 1, wherein the wood pieces are formed from log members, each log member being cut into two half portions, each half portion having a substantially semi-cylindrical shape including a base, each wood piece being formed from one of the half portions such that each outer surface corresponds substantially to the base of the semi-cylindrical shape of the one of the half portions.

3. A composite wood article according to claim 2, wherein said wood pieces are arranged in two opposing pairs, and wherein each wood piece of at least one of the opposing pairs includes at least three steps on each stair-like surface.

4. A composite wood article according to claim 3, wherein two of the wood pieces are each joined to three of the wood pieces in a mating arrangement.

5. A composite wood article according to claim 1, wherein said wood pieces are arranged in two opposing pairs, the wood pieces of each opposing pair having substantially the same cross-sectional size; and wherein each wood piece of at least one of the opposing pairs includes at least three steps on each stair-like surface.

6. A composite wood article according to claim 1, wherein the cross-sectional size of each of the wood pieces is substantially identical.

7. A composite wood article according to claim 6, wherein each of the wood pieces includes at least three steps on each stair-like surface and wherein said substantially rectangular outer cross-section forms a square.

8. A composite wood article according to claim 6, wherein the composite wood article is symmetrical about each of its cross-sectional axes.

9. A composite wood article according to claim 1, wherein two of the wood pieces are each joined to three of the wood pieces in a mating arrangement.

10. A composite wood article according to claim 9, wherein each wood piece is an elongated beam and said inner and outer surfaces are substantially planar.

11. A composite wood article comprising:

four wood pieces, each wood piece having at least four lateral surfaces comprising:

an inner surface;

two stair-like surfaces shaped in opposing arrangement so as to meet each other to form said inner surface, each stair-like surface consisting essentially of a plurality of right-angled steps arranged in an offset sequence so as to converge towards said inner surface, each stair-like surface sized to mate with one of the stair-like surfaces of another of said wood pieces;

an outer surface located opposite said inner surface and adjoining one of the right-angled steps on each of said stair-like surfaces in a substantially orthogonal arrangement, said outer surface substantially parallel with said inner surface; and wherein each wood piece is substantially symmetrical around a notional plane bisecting both the inner surface and the outer surface, said notional plane being located substantially between said two stair-like surfaces;

wherein said wood pieces are arranged in two opposing pairs, the wood pieces of each opposing pair having substantially the same cross-sectional size, each stair-like surface on each of the wood pieces of at least one of the opposing pairs having at least three steps; and wherein said wood pieces are joined along the stair-like surfaces with each inner surface arranged inwardly such that the composite wood article has a substantially rectangular outer cross-section.

12. A composite wood article according to claim 11, wherein the wood pieces are formed from log members, each log member being cut into two half portions, each half portion having a substantially semi-cylindrical shape including a base, each wood piece being formed from one of the half portions such that the outer surface corresponds substantially to the base of the semi-cylindrical shape.

13. A composite wood article according to claim 12, wherein the cross-sectional size of each of the wood pieces is substantially identical.

14. A composite wood article according to claim 13, wherein two of the wood pieces are each joined to three of the wood pieces in a mating arrangement.

15. A composite wood article according to claim 14, wherein the composite wood article is symmetrical about each of its cross-sectional axes.

16. A composite wood article according to claim 11, wherein the cross-sectional size of each of the wood pieces is substantially identical.

17. A composite wood article according to claim 11, wherein two of the wood pieces are each joined to three of the wood pieces in a mating arrangement.

18. A composite wood article according to claim 11, wherein the composite wood article is symmetrical about each of its cross-sectional axes.

19. A method of fabricating a composite wood article, the method comprising the steps of:

(a) cutting small diameter timber transversely into log segments each having a length no more than a predetermined maximum length so as to minimize warping of the log segments when exposed to kiln drying;

(b) cutting each log segment into two half cylindrical-like sections;

(c) kiln drying each half cylindrical-like section;

(d) mold cutting each half cylindrical-like section into a wood piece having at least four lateral surfaces including: (i) an inner surface; (ii) two stair-like surfaces shared in opposing arrangement so as to meet each other to form said inner surface, each stair-like surface consisting essentially of a plurality of right-angled steps arranged in a progressively offset sequence so as to converge towards said inner surface, each stair-like surface sized to mate with one of the stair-like surfaces of another of said wood pieces; and (iii) an outer surface located opposite said inner surface and adjoining one of the right-angled steps on each of said stair-like surfaces, said outer surface substantially parallel with said inner surface;

said mold cutting step including shaping each wood piece so that it is substantially symmetrical around a notional plane bisecting both the inner surface and the outer surface, the notional plane being located substantially between said two stair-like surfaces; and (e) joining four of said wood pieces together along their stair-like surfaces with their inner surfaces arranged inwardly such that the composite wood article has a substantially rectangular outer cross-section.

20. A method according to claim 19, including in said mold cutting step the step of cutting at least three steps on each of said stair-like surfaces; and including in said joining step the step of arranging said four wood pieces into opposing pairs such that the wood pieces of each opposing pair have substantially the same cross-sectional size.

21. A method according to claim 19, wherein said predetermined maximum length is about one meter, and where the method includes finger jointing each half cylindrical-like section between said kiln drying step and said mold cutting step.

22. A method according to claim 21, including planing said composite wood article after said kiln drying step.

* * * * *

UNITED STATES PATENT AND TRADEMARK OFFICE

CERTIFICATE OF CORRECTION

PATENT NO. : 5,870,876

DATED : Feb. 16, 1999

INVENTOR(S) : Frank Deiter

It is certified that error appears in the above-identified patent and that said Letters Patent is hereby corrected as shown below:

Column 2, line 5, after "cross-section." insert

--In one aspect of the invention, the wood pieces can be advantageously formed from log members with each log member cut into two substantially half portions. Each half portion has a substantially semi-cylindrical shape including a base, with each wood piece being formed from one of the half portions such that each outer surface corresponds substantially to the bases of the half portions.

The wood pieces can be arranged in opposing pairs, with each wood piece of at least one of the opposing pairs having at least three steps on each stair-like surface. In one embodiment, each of two of the wood pieces can be joined to all of the other wood pieces in a mating arrangement. In another embodiment, the cross-sectional size of each of the wood pieces is substantially identical. With this latter embodiment, each of the wood pieces may include at least three steps on stair-like surface and form a substantially square cross-section when arranged to form the composite wood article.

Further according to the invention, there is provided a method of fabricating a composite wood article, the method comprising the steps of:

(a) cutting small diameter timber transversely into log segments each having a length no more than a predetermined maximum length so as to minimize warping of the log segments when exposed to kiln drying;

UNITED STATES PATENT AND TRADEMARK OFFICE

CERTIFICATE OF CORRECTION

PATENT NO. : 5,870,876
DATED : Feb. 16, 1999
INVENTOR(S) : Frank Deiter

It is certified that error appears in the above-identified patent and that said Letters Patent is hereby corrected as shown below:

(b) cutting each log segment into two half cylindrical-like sections;

(c) kiln drying each half cylindrical-like section;

(d) mold cutting each half cylindrical-like section into a wood piece having at least four lateral surfaces including: (i) an inner surface; (ii) two stair-like surfaces shaped in opposing arrangement so as to meet each other to form said inner surface, each stair-like surface consisting essentially of a plurality of right-angled steps arranged in an progressively offset sequence so as to converge towards the inner surface, each stair-like surface sized to mate with one of the stair-like surfaces of another of said wood pieces; and (iii) an outer surface located opposite said inner surface and adjoining one of the right-angled steps on each of the stair-like surfaces, the outer surface substantially parallel with the inner surface;

the mold cutting step including shaping each wood piece so that it is substantially symmetrical around a notional plane bisecting both the inner surface and the outer surface, the notional plane being located substantially between the two stair-like surfaces; and

UNITED STATES PATENT AND TRADEMARK OFFICE

CERTIFICATE OF CORRECTION

PATENT NO. : 5,870,876

DATED : Feb. 16, 1999

INVENTOR(S) : Frank Deiter

It is certified that error appears in the above-identified patent and that said Letters Patent is hereby corrected as shown below:

(e) joining four of said wood pieces together along their stair-like surfaces with their inner surfaces arranged inwardly such that the composite wood article has a substantially rectangular outer cross-section.

The method can include in the mold cutting step the step of cutting at least three steps on each of the stair-like sides; and, in the joining step, the step of arranging the four pieces into opposing pairs such that the wood pieces of each opposing pair have substantially the same cross-sectional size. In one preferred embodiment, the predetermined maximum length is about one meter and the method includes finger joining each half cylindrical-like section between the kiln drying step and the mold cutting step.--

UNITED STATES PATENT AND TRADEMARK OFFICE

CERTIFICATE OF CORRECTION

PATENT NO. : 5,870,876
DATED : Feb. 16, 1999
INVENTOR(S) : Frank Deiter

Figure 7A:
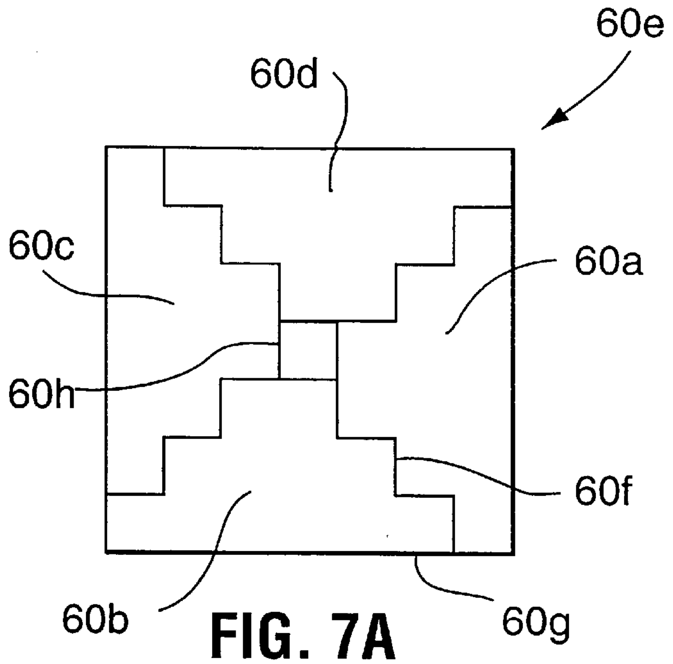
FIG. 7A is a cross-sectional view of another composite wood product.

It is certified that error appears in the above-identified patent and that said Letters Patent is hereby corrected as shown below:

Column 3, line 23, delete "that" and substitute --flat--;
line 24, after "wood" insert --article 30--;
line 38, after "indicated" and "example" insert commas --,--;
line 52, after "Referring to" insert --Fig. 7A--.

Column6, line 9, delete "alone" and substitute --along--.

Signed and Sealed this

Twenty-first Day of September, 1999

Attest:

Q. TODD DICKINSON

*Attesting Officer*

*Acting Commissioner of Patents and Trademarks*